(12) United States Patent
Woytassek et al.

(10) Patent No.: US 6,237,242 B1
(45) Date of Patent: May 29, 2001

(54) MICRORADIAN ADJUSTMENT ASSEMBLY

(75) Inventors: Mark Woytassek, Cedar Rapids; John Larison, Marion; Richard Robertson, Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/315,911

(22) Filed: May 20, 1999

(51) Int. Cl.[7] ............................ G01D 21/00; B23B 45/14
(52) U.S. Cl. .................. 33/645; 33/644; 33/613; 33/334
(58) Field of Search ............................. 33/644, 645, 613, 33/334

(56) References Cited

U.S. PATENT DOCUMENTS

| | | | |
|---|---|---|---|
| 4,196,522 | * | 4/1980 | Bell et al. ............................. 33/645 |
| 4,563,824 | * | 1/1986 | Baun ................................... 33/644 |
| 5,235,842 | * | 8/1993 | Freeman et al. ...................... 33/644 |
| 5,926,781 | * | 7/1999 | Scott ................................... 33/644 |
| 6,023,851 | * | 2/2000 | Brand .................................. 33/645 |
| 6,047,480 | * | 4/2000 | Powers ................................ 33/645 |

* cited by examiner

*Primary Examiner*—Diego Gutierrez
*Assistant Examiner*—Yaritza Guadalupe
(74) *Attorney, Agent, or Firm*—Nathan O. Jensen; Kyle Eppele; J. P. O'Shaughnessy

(57) ABSTRACT

An assembly for providing microradian adjustment of the alignment of objects such as optical devices is disclosed. The microradian adjustment assembly is comprised of a mounting plate suitable for mounting an object and a torque adjustment assembly. A circular channel is formed in the plate so as to define a disk area surrounded by a deflection area. The torque adjustment assembly torsionally deforms the deflection area, rotating the disk area with respect to the mounting plate. This rotation is utilized to provide microradian adjustment of the alignment of the object.

20 Claims, 4 Drawing Sheets

MICRORADIAN ADJUSTMENT ASSEMBLY

BACKGROUND OF THE INVENTION

The present invention relates generally to precision mounting devices commonly utilized in the fields of optics and holography, and more specifically to a mounting device providing microradian adjustment of the alignment of an object, particularly an optical component such as a holographic medium, lens, prism, or the like.

At present, alignment of optical components in a system is accomplished utilizing high precision mounting devices such as kinematic mounts or bases. Kinematic mounts allow users to repeatedly mount, remove and relocate or realign components with a high degree of accuracy. As a result, such mounts are especially useful where optical components must frequently be interchanged, or where reference elements must occasionally be inserted in an optical path.

Existing kinematic mounts are capable of providing angular alignment of an object to within about two (2) microradians ($\mu$rad). While this level of precision is adequate for most optics applications, certain highly specialized applications require an even greater level of precision. For instance, holographic correlators and holographic memories employing removable holographic media require microradian alignment of the media with beams of light produced by a laser for optimum performance. The level of alignment provided by present kinematic mounts is too gross for such applications. Further, mechanical mounting apparatus capable of greater precision are not presently available.

Consequently, there exists a general need for mounting devices capable of providing microradian adjustment of the alignment of an object with respect to a point of reference. More specifically, there exists a need for a mounting device for providing microradian adjustment of an optical component such as a removable holographic medium, lens, prism, etc. within an optical system such as a holographic correlator, holographic memory, or the like.

SUMMARY OF THE INVENTION

Accordingly, the present invention is directed to a novel assembly capable of providing microradian adjustment of the alignment of objects such as optical devices. The microradian adjustment assembly is comprised of a mounting plate suitable for mounting an object such as an optical component (e.g., holographic medium, lens, prism, etc.). A circular channel is formed in the mounting plate so as to define a disk area (i.e., a circular area of the mounting plate bounded by the channel) and a deflection area (i.e., an area of the mounting plate within the channel surrounding the disk area). When torque is applied to the disk area, the deflection area is torsionally deformed, rotating the disk area and object with respect to the rest of the plate. Because rotation of the disk area due to deformation of the deflection area is small, microradian adjustment of the alignment of the object is possible.

In an exemplary embodiment, torque is applied to the disk area via a torque adjustment assembly. The torque adjustment assembly includes a screw support structure integrally formed in the surface of the mounting plate opposite the surface on which the channel is formed. One or more threaded apertures are formed in the screw support structure. Screws extend through these apertures to engage leverage blocks disposed on the mounting plate within an area bounded by the outer edge of the channel. When tightened against the leverage blocks, the screws apply force to the leverage blocks providing torque to the disk area. This torque torsionally deforms the deflection area thereby rotating the disk area. The amount of rotation of the disk area, and thus the alignment of the object, is adjusted by regulating the amount of force applied to each leverage block.

The microradian adjustment assembly may, in an exemplary embodiment, be utilized to provide microradian adjustment of the alignment of a removable holographic medium in a holographic correlator or holographic memory.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiments of the invention, examples of which is illustrated in the accompanying drawings.

Figure 5:
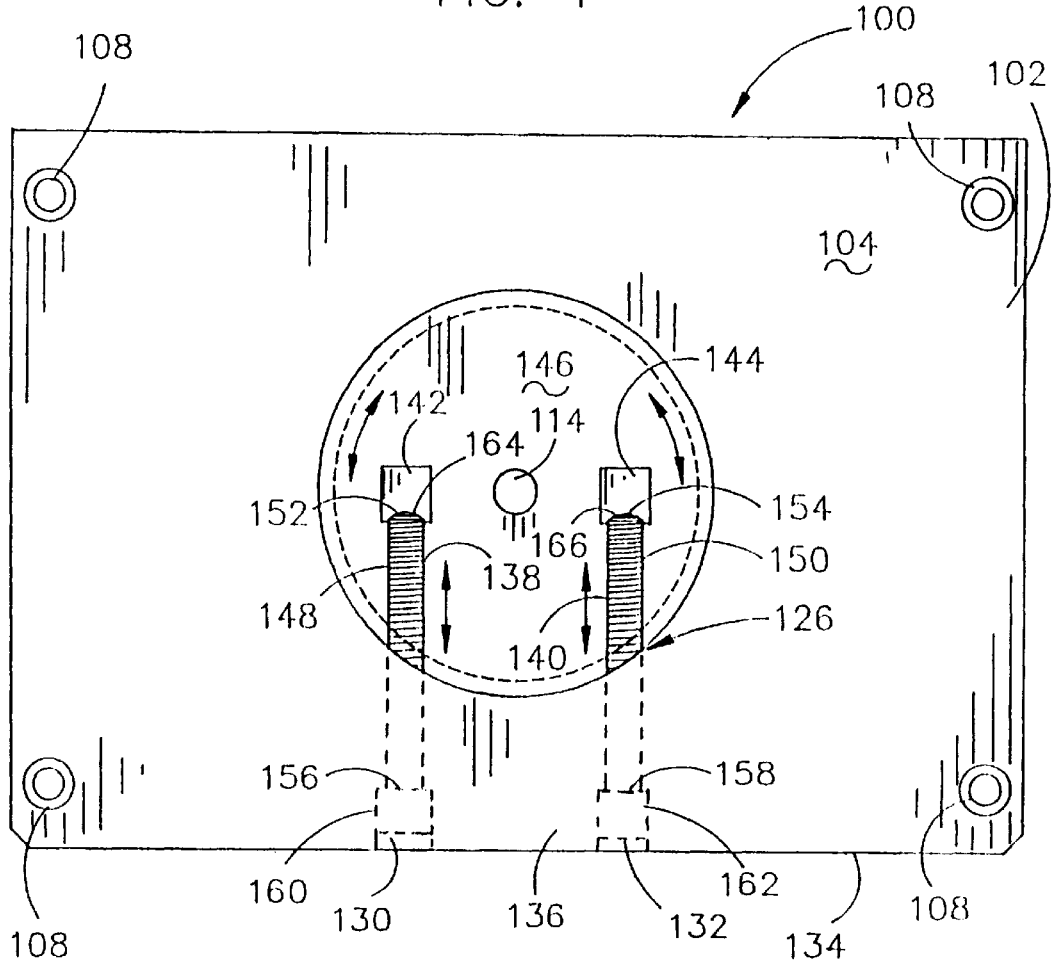
FIG. 5 is a top plan view of the microradian adjustment plate shown in FIG. 1.
Figure 6:
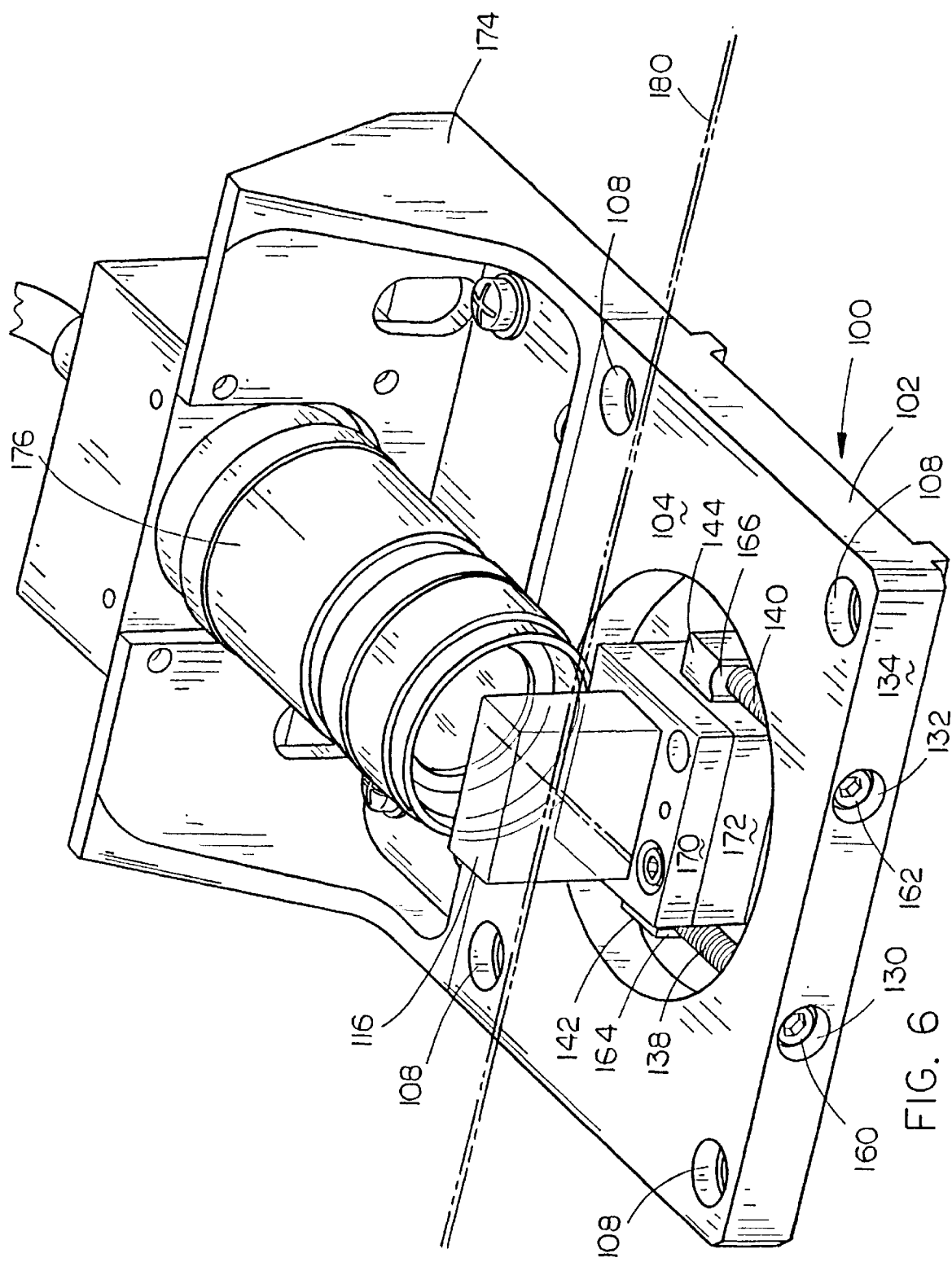
FIG. 6 is an isometric view of a holographic correlator utilizing the microradian adjustment plate shown in FIG. 1.

Referring now to FIGS. 1 through 6 in general, a microradian adjustment assembly 100 in accordance with an exemplary embodiment of the present invention is shown. The microradian adjustment assembly 100 provides precise adjustment of the alignment of an object with respect to a point of reference. For example, as shown in FIG. 6, the microradian adjustment plate may be used to provide microradian adjustment of an optical component such as a removable holographic medium, lens, prism, etc. within an optical system such as a holographic correlator, holographic memory, or the like. In such an application, the microradian adjustment assembly 100 may be sized to provide alignment tolerances of less than about two (2) microradians ($\mu$rad) and a range of alignment of approximately fifty (50) $\mu$rad.

Figure 1:
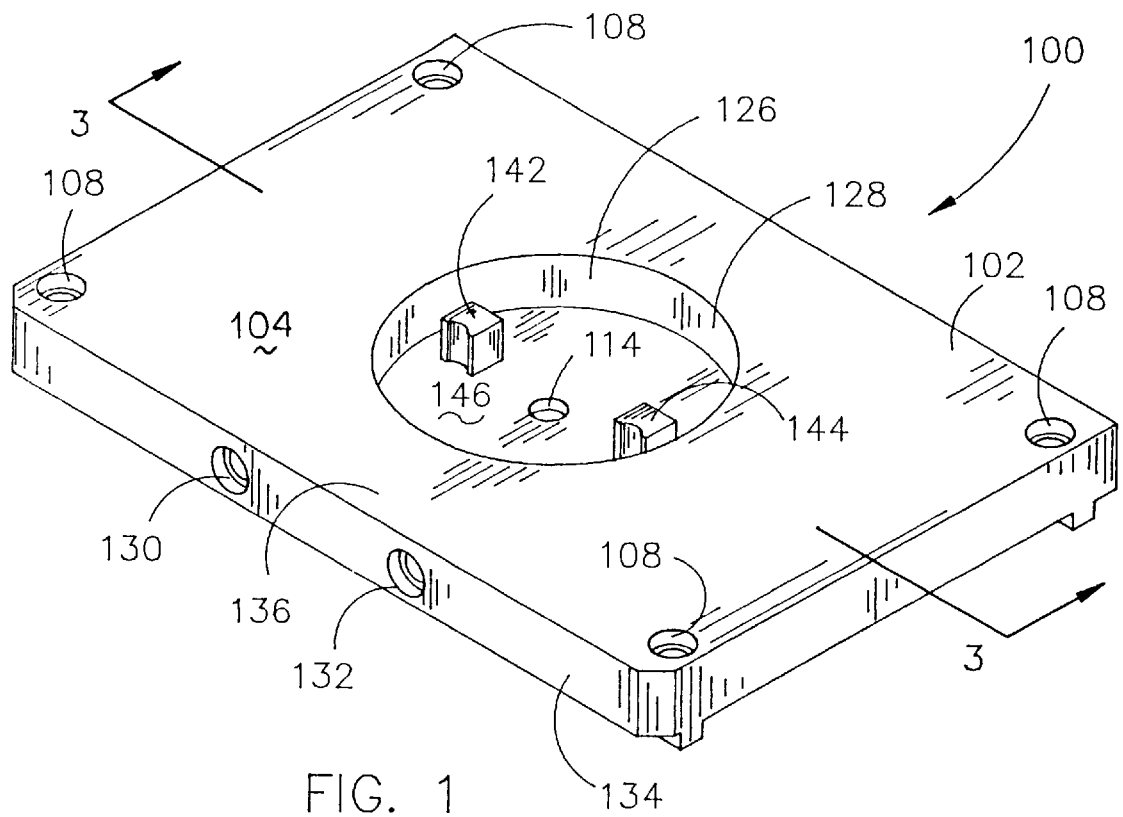
FIG. 1 is an isometric view of a microradian adjustment plate in accordance with an exemplary embodiment of the present invention illustrating the upper surface of the plate.
Figure 2:
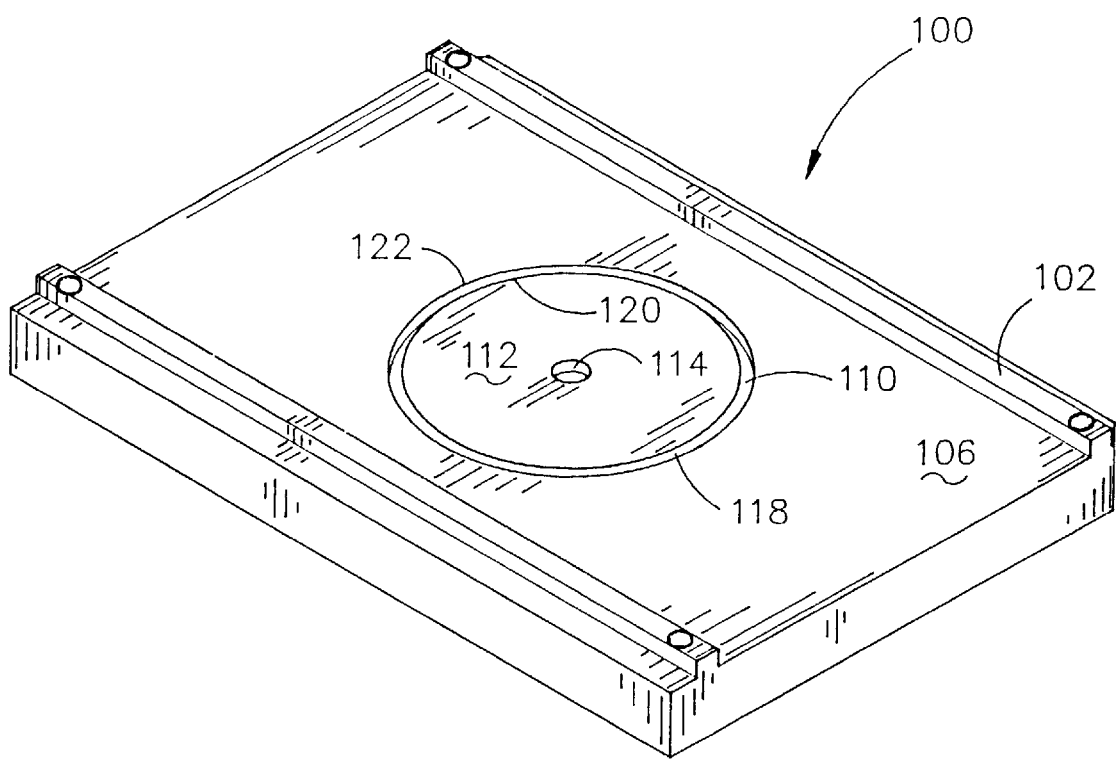
FIG. 2 is an isometric view of the microradian adjustment plate shown in FIG. 1, illustrating the lower surface of the plate.

The microradian adjustment assembly 100 is comprised of a mounting plate 102 having a first or upper surface 104, shown in FIG. 1, and a second or lower surface 106, shown in FIG. 2. A plurality of mounting holes 108 (four are shown) extend through mounting plate 102 for mounting the plate 102 to a stationary surface via fasteners such as screws, bolts, etc (not shown).

A channel 110 is formed in the lower surface 106 of mounting plate 102. As shown in FIG. 2, the channel 110, which is circular in shape, defines a disk area 112. The disk area is comprised of the area of mounting plate 102 contained within the channel 110. A hole 114 is shown centered in disk area 112 for mounting an object such as an optical device (e.g., holographic medium 116 shown in FIG. 6, or alternately, a lens, prism, etc.) via a fastener such as a screw, bolt, etc. (not shown). However, it should be appreciated that other means may be provided for mounting an object to the plate (e.g., other mounting hole configurations, adhesive, etc.).

Channel 110 further defines a deflection area 118 surrounding the disk area 112. The deflection area 118 is comprised of the ring-shaped portion of mounting plate 102 between the inner and outer diameters 120 & 122 of channel 110. Preferably, deflection area 118 has a reduced thickness in comparison with the rest of mounting plate 102 so that it may deform upon application of torque to disk area 112. This deformation allows disk area 112 to rotate with respect to the remainder of mounting plate 102.

Figure 3:
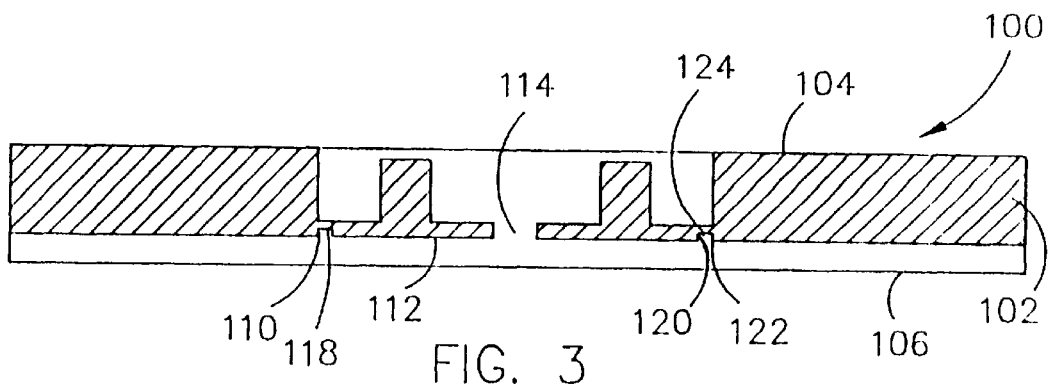
FIG. 3 is a cross-sectional side elevational view of the microradian adjustment plate shown in FIG. 1, wherein the section is taken along line 3—3 and illustrates the cross-sectional shape of the disk area, deflection area, and leverage blocks.
Figure 4:
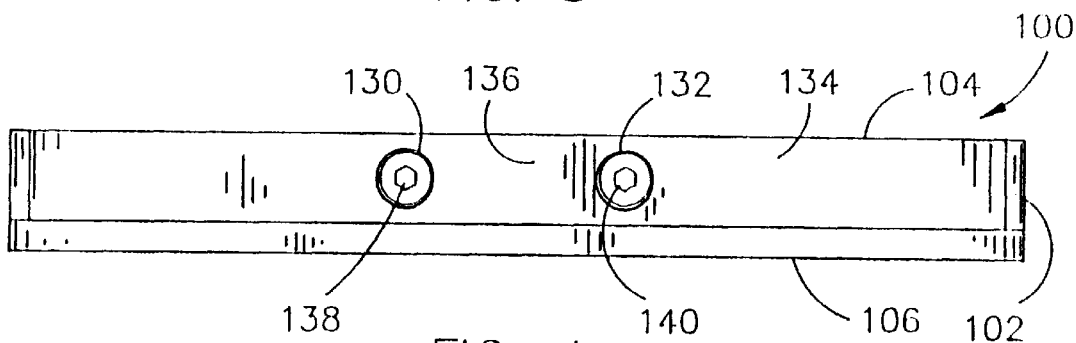
FIG. 4 is a side elevational view of the microradian adjustment plate shown in FIG. 1.

In the exemplary embodiment shown in FIG. 3, channel 110 is generally rectangular in cross-sectional shape so that it has a substantially flat interior surface 124. Thus, the deflection area 118 comprises the small area of mounting plate 102 directly above surface 124 (as shown in FIG. 3). However, it should be appreciated that alternative embodiments of the invention may utilize channels having other cross-sectional shapes (e.g., curved, trapezoidal, etc.) without departing from the scope and spirit of the present invention. Deflection areas formed by such channels could, for example, provide more or less deformation than the embodiment shown herein so that the range of adjustment of the microradian adjustment plate may be customized for a particular application.

A torque adjustment assembly 126 is provided in the upper surface 104 of mounting plate 102. The user may adjust the torque adjustment assembly 126 to control the amount of torque applied to disk area 112. In the exemplary embodiment shown in FIGS. 1, 3, 4 and 5, torque adjustment assembly 126 is comprised of a chamber 128 formed in the upper surface 104 of mounting plate 102. Preferably, chamber 128 is cylindrical in shape and has a diameter at least equal to the outer diameter 122 of channel 110. Further, as shown in FIG. 3, chamber 128 is concentrically positioned opposite channel 110 and extends into mounting plate 102 so that the thicknesses of deflection area 118 and disk area 112 are small in comparison to the thickness of the rest of the plate 102. Preferably, the object mounted to microradian adjustment assembly 100 is mounted within chamber 128 so that it is centered over disk area 112.

Apertures 130 & 132 extend from a side surface 134 of mounting plate 102 into chamber 128 to form a screw support structure 136 through which screws 138 & 140 may be threaded. Leverage blocks 142 & 144 are disposed on the bottom surface 146 of chamber 128 within an area defined by the outer diameter 122 of channel 110. Screws 138 & 140 are threaded though apertures 130 & 132 to engage leverage blocks 142 & 144.

Each screw 138 & 140 preferably comprises a threaded, cylindrical rod 148 & 150 having a first end 152 & 154 suitable for engaging the leverage block 142 & 144 and a second end 156 & 158 provided with a head 160 & 162 suitable for rotating the threaded, cylindrical rod 148 & 150 to advance and retract the screw 138 & 140. When advanced or tightened against the faces 164 & 166 of leverage blocks 142 & 144, the screws 138 & 140 apply a force against the leverage blocks 142 & 144. These forces provide a torque in disk area 112, torsionally deforming the deflection area 118 so that disk area 112 is rotated.

As shown in FIGS. 1 and 5, the faces 164 & 166 of leverage blocks 142 & 144 may be curved so that screws 138 & 140 remain perpendicular to the curved faces 164 & 166 of leverage blocks 142 & 144 as disk area 112 rotates. In this manner, the forces generated by screws 138 & 140 is applied along a line which is always substantially normal to the faces 164 & 166 of leverage blocks 142 & 144 throughout the entire range of motion of disk area 112.

As shown in FIG. 5, the direction and degree of rotation of disk area 112, and any object affixed thereto, is regulated by varying the amount of force applied to each leverage block 142 & 144 by screws 138 & 140. Preferably, disk area 112 may be rotated in either the clockwise or counterclockwise directions (as viewed from above in FIG. 5).

For clockwise rotation of disk area 112, screw 138 is tightened against the face 164 of leverage block 142 increasing the force applied to that leverage block 142. At the same time screw 140 is loosened from the face 166 of leverage block 144 decreasing the force applied to that leverage block 144. The combination of increased force applied to leverage block 142 and decrease force applied to leverage block 144 applies a torque to disk area 112. This torque causes deflection area 118 to deform torsionally (i.e., in a twisting fashion). As deflection area 118 is deformed, disk area 112, and any object affixed thereto, rotates in the clockwise direction.

Similarly, for counter-clockwise rotation of disk area 112, screw 140 is tightened against the face 166 of leverage block 144 while screw 138 is loosened from the face 164 of leverage block 142. Thus, the force applied to leverage block 144 is increased and the force applied to leverage block 142 is decreased so that a torque is applied to disk area 112. This torque causes deflection area 118 to deform torsionally so that disk area 112, and any object affixed thereto, rotates in the counter-clockwise direction.

Referring now to FIG. 6, in an exemplary embodiment, the microradian adjustment assembly 100 may be utilized in the field of holography to provide extremely precise angular alignment of holographic media in devices such as holographic correlator or holographic memory. A holographic medium 116 is affixed to a first kinematic mount 170, which is in turn mounted to a second kinematic mount 172. The second kinematic mount 172 is attached to the microradian adjustment assembly 100 of the present invention. The microradian adjustment assembly 100 may further be attached to a camera mount 174 supporting a camera/lens assembly 176.

First and second kinematic mounts 170 & 172 provide adjustment of the orientation of holographic medium 116 with respect to the camera/lens assembly 176, and may provide gross alignment of the holographic medium 116 with respect to laser beam 180 generated by a laser (not shown). The alignment of holographic medium 116 may then be microradially adjusted with respect to the path of laser beam 180 via the microradian adjustment assembly 100 of the present invention.

Figure 7:
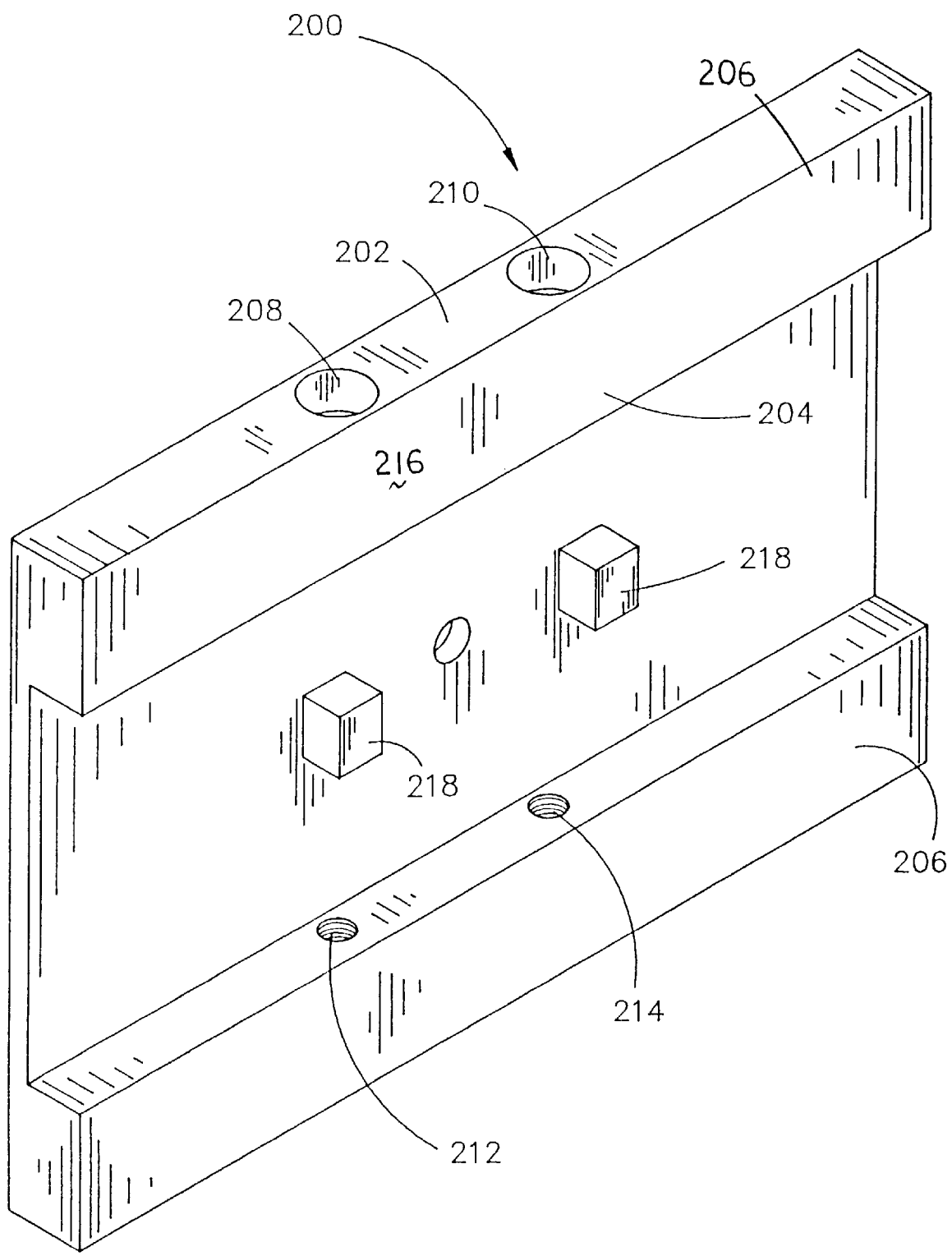
FIG. 7 is an isometric view of a microradian adjustment plate in accordance with an alternative embodiment of the present invention.

Referring now to FIG. 7, a microradian adjustment assembly 200 in accordance with an alternative embodiment of the present invention is shown. Like the first embodiment shown in FIGS. 1 through 6, microradian adjustment assembly 200 comprises a mounting plate 202 having a circular channel, a disk area, and a deflection area (not shown). However, instead of the cylindrical chamber 128 formed in the mounting plate 102 of the first embodiment (see FIG. 1), the torque adjustment assembly 204 of microradian adjustment assembly 200 includes side rails 206 formed along distal edges of mounting plate 202. Threaded apertures 208, 210, 212 & 214 extend through side rails 206 to form a screw support structure 216 through which screws (not shown) may be threaded. The side rails 206 serve as leverage points for the screws that are threaded through apertures 208, 210, 212 & 214 to apply a force against leverage blocks 218. Like the first embodiment shown in FIGS. 1 through 6, the direction (clockwise or counter-clockwise) and degree of rotation of an object affixed to microradian adjustment assembly 200 is regulated by varying the amount force applied to each leverage block 218 by screws threaded through apertures 208, 210, 212 & 214.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mounting device providing microradian adjustment of the alignment of an object, comprising:
    a plate suitable for mounting an object, said plate having a circular channel formed therein so as to define a disk area surrounded by a deflection area; and
    a torque adjustment assembly;
    wherein said torque adjustment assembly torsionally deforms said deflection area thereby rotating said disk area with respect to said plate so as to adjust of the alignment of the object.

2. The mounting device as recited in claim 1, wherein said torque adjustment assembly further comprises:
    a screw;
    a screw support structure integrally formed on said plate, said screw support structure having an aperture through which said screw may be threaded; and
    a block disposed on said plate within an area defined by an outer edge of said channel;
    wherein said screw is advanced through said aperture to engage said block.

3. The mounting device as recited in claim 2, wherein said screw comprises a threaded, cylindrical rod having a first end suitable for engaging said block and a second end provided with a head suitable for rotating said threaded, cylindrical rod to advance said screw through said aperture.

4. The mounting device as recited in claim 3, wherein engagement of said block by said threaded rod applies a torque to said disk area.

5. The mounting device as recited in claim 2, wherein said block includes a concave face for engagement of said screw.

6. The mounting device as recited in claim 2, wherein said circular channel is formed in a first surface of said plate and said screw support structure and block are formed in a second surface of said plate opposite said first surface.

7. The mounting device as recited in claim 6, wherein said screw support structure comprises a cavity formed in said second surface.

8. The mounting device as recited in claim 7, wherein said cavity is cylindrical in shape and has a diameter at least equal to the outer diameter of said channel.

9. The mounting device as recited in claim 6, wherein said screw support structure comprises at least one rail integrally formed on said second surface.

10. A microradian adjustment assembly, comprising:
    a plate having a first side and a second side, said first side suitable for mounting an object and said second side having a circular channel formed therein so as to define a disk area for mounting an object surrounded by a deflection area;
    a screw;
    a screw support structure integrally formed on said plate, said screw support structure having an aperture; and
    a block disposed on said plate;
    wherein said screw is threaded through said aperture to engage said block so as to torsionally deform said deflection area and rotate said disk area with respect to said plate.

11. The microradian adjustment assembly as recited in claim 10, wherein said block is disposed on said plate within an area defined by an outer edge of said channel.

12. The microradian adjustment assembly as recited in claim 11, wherein said screw comprises a threaded, cylindrical rod having a first end suitable for engaging said block and a second end provided with a head suitable for rotating said threaded, cylindrical rod to advance said screw through said aperture.

13. The microradian adjustment assembly as recited in claim 12, wherein engagement of said block by said threaded rod applies a torque to said disk area.

14. The microradian adjustment assembly as recited in claim 13, wherein said block includes a concave face for engagement of said screw.

15. The microradian adjustment assembly as recited in claim 10, wherein said circular channel is formed in a first surface of said plate and said screw support structure and block are formed in a second surface of said plate opposite said first surface.

16. The microradian adjustment assembly as recited in claim 15, wherein said screw support structure comprises a cavity formed in said second surface.

17. The microradian adjustment assembly as recited in claim 16, wherein in said cavity is cylindrical in shape and has a diameter at least equal to the outer diameter of said channel.

18. The microradian adjustment assembly as recited in claim 16, wherein said screw support structure comprises at least one rail integrally formed on said second surface.

19. A mount for providing microradian angular adjustment of the alignment of an object, comprising:
    a plate for mounting an object, said plate including a circular channel formed therein to define a disk surrounded by a deflection area; and
    means for torsionally deforming said deflection area so that said disk is rotated with respect to said plate to provide microradian adjustment of the alignment of the object.

20. The mount as recited in claim 19, wherein said deforming means further comprises:
    a screw;
    a screw support structure integrally formed on said plate, said screw support structure having an aperture through which said screw may be threaded; and
    a block disposed on said plate within an area defined by an outer edge of said channel;
    wherein said screw is advanced through said aperture to engage said block.

* * * * *